US008797405B2

(12) United States Patent
Cobb et al.

(10) Patent No.: US 8,797,405 B2
(45) Date of Patent: Aug. 5, 2014

(54) VISUALIZING AND UPDATING CLASSIFICATIONS IN A VIDEO SURVEILLANCE SYSTEM

(75) Inventors: Wesley Kenneth Cobb, The Woodlands, TX (US); Bobby Ernest Blythe, Houston, TX (US); David Samuel Friedlander, Houston, TX (US); Rajkiran Kumar Gottumukkal, Houston, TX (US); Kishor Adinath Saitwal, Houston, TX (US); Ming-Jung Seow, Houston, TX (US); Gang Xu, Katy, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 1037 days.

(21) Appl. No.: 12/551,332

(22) Filed: Aug. 31, 2009

(65) Prior Publication Data

US 2011/0050897 A1 Mar. 3, 2011

(51) Int. Cl.
*H04N 7/18* (2006.01)
*G06K 9/00* (2006.01)
(52) U.S. Cl.
CPC ............... *G06K 9/00771* (2013.01); *G06K 9/00973* (2013.01)
USPC .......................................... 348/143; 348/161
(58) Field of Classification Search
None
See application file for complete search history.

(56) References Cited

U.S. PATENT DOCUMENTS

| 4,679,077 | A | 7/1987 | Yuasa et al. |
| 5,113,507 | A | 5/1992 | Jaeckel |
| 5,748,775 | A | 5/1998 | Tsuchikawa et al. |
| 5,751,378 | A | 5/1998 | Chen et al. |
| 5,969,755 | A | 10/1999 | Courtney |
| 6,252,974 | B1 | 6/2001 | Martens et al. |
| 6,263,088 | B1 | 7/2001 | Crabtree et al. |
| 6,570,608 | B1 | 5/2003 | Tserng |
| 6,661,918 | B1 | 12/2003 | Gordon et al. |
| 6,674,877 | B1 | 1/2004 | Jojic et al. |
| 6,678,413 | B1 | 1/2004 | Liang et al. |
| 6,856,249 | B2 | 2/2005 | Strubbe et al. |
| 6,940,998 | B2 | 9/2005 | Garoutte |
| 7,076,102 | B2 | 7/2006 | Lin et al. |
| 7,136,525 | B1 | 11/2006 | Toyama et al. |
| 7,158,680 | B2 | 1/2007 | Pace |

(Continued)

FOREIGN PATENT DOCUMENTS

WO 2009049314 A2 4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.
Helmut Grabner et al., "On-line Boosting and Vision," IEEE Conference on Computer Vision and Pattern Recognition (CVPR), 2006, vol. 1: pp. 260-267.

(Continued)

*Primary Examiner* — Thomas Dailey
*Assistant Examiner* — Nam Tran
(74) *Attorney, Agent, or Firm* — Patterson & Sheridan LLP

(57) ABSTRACT

Techniques are disclosed for visually conveying classifications derived from pixel-level micro-features extracted from image data. The image data may include an input stream of video frames depicting one or more foreground objects. The classifications represent information learned by a video surveillance system. A request may be received to view a classification. A visual representation of the classification may be generated. A user interface may be configured to display the visual representation of the classification and to allow a user to view and/or modify properties associated with the classification.

15 Claims, 7 Drawing Sheets

(56) References Cited

U.S. PATENT DOCUMENTS

| | | | |
|---|---|---|---|
| 7,200,266 | B2 | 4/2007 | Ozer et al. |
| 7,227,893 | B1 | 6/2007 | Srinivasa et al. |
| 7,436,887 | B2 | 10/2008 | Yeredor et al. |
| 7,606,425 | B2 * | 10/2009 | Bazakos et al. ............... 348/143 |
| 7,825,954 | B2 | 11/2010 | Zhang et al. |
| 7,868,912 | B2 | 1/2011 | Venetianer et al. |
| 8,165,407 | B1 * | 4/2012 | Khosla et al. ................. 382/224 |
| 2003/0107650 | A1 | 6/2003 | Colmenarez et al. |
| 2004/0151342 | A1 | 8/2004 | Venetianer et al. |
| 2005/0001759 | A1 | 1/2005 | Khosla |
| 2005/0105765 | A1 | 5/2005 | Han et al. |
| 2005/0240629 | A1 | 10/2005 | Gu et al. |
| 2006/0018516 | A1 | 1/2006 | Masoud et al. |
| 2006/0165386 | A1 | 7/2006 | Garoutte |
| 2006/0190419 | A1 | 8/2006 | Bunn et al. |
| 2006/0222206 | A1 | 10/2006 | Garoutte |
| 2008/0002856 | A1 | 1/2008 | Ma et al. |
| 2008/0181453 | A1 | 7/2008 | Xu et al. |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0252723 | A1 | 10/2008 | Park |
| 2009/0022364 | A1 | 1/2009 | Swaminathan et al. |
| 2009/0067716 | A1 | 3/2009 | Brown et al. |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0063949 | A1 | 3/2010 | Eaton et al. |

OTHER PUBLICATIONS

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

VISUALIZING AND UPDATING CLASSIFICATIONS IN A VIDEO SURVEILLANCE SYSTEM

BACKGROUND OF THE INVENTION

1. Field of the Invention

Embodiments of the invention provide techniques for conveying information learned by a video surveillance system. More specifically, embodiments of the invention relate to techniques for visualizing and updating object classifications in a video surveillance system.

2. Description of the Related Art

Some currently available video surveillance systems provide simple object recognition capabilities. For example, a video surveillance system may be configured to classify a group of pixels (referred to as a "blob") in a given frame as being a particular class of object (e.g., a person or vehicle). Once identified, a "blob" may be tracked frame-to-frame in order to follow the "blob" moving through the scene over time, e.g., a person walking across the field of vision of a video surveillance camera. Further, such systems may be configured to determine when an object has engaged in certain predefined behaviors.

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" or "abnormal" behavior needs to be defined in advance, and separate software products need to be developed to recognize additional objects or behaviors. This results in surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns as being "normal" or "abnormal" by observing what happens in the scene over time; instead, such systems rely on static patterns defined in advance.

SUMMARY OF THE INVENTION

One embodiment of the invention includes a computer-implemented method for a video surveillance system to process a sequence of video frames depicting a scene captured by a video camera. The method may generally include receiving a request to view an object classification type assigned to a foreground object depicted in the sequence of video frames. The object classification type may be used to classify the foreground object as being an instance of one of a plurality of foreground object classification types. Additionally, the object classification type may assigned to the foreground object based on a plurality of micro-features derived from analyzing pixels depicting the foreground object in the sequence of video frames. The method may further include generating a visual representation of the requested object classification type and outputting the generated visual representation for display.

In a particular embodiment, object classification type is generated by mapping micro-features derived from a plurality of foreground objects to nodes of a self-organizing map (SOM) and using an Adaptive Resonance Theory (ART) network to cluster the resulting nodes of the SOM. Further, the visual representation of the requested object classification type may include image data from the sequence of video frames depicting one or more instances of the object classification type.

Still another embodiment includes a computer-readable storage medium containing a program which, when executed by a video surveillance system, performs an operation to process a sequence of video frames depicting a scene captured by a video camera. The operation itself may generally include receiving a request to view an object classification type assigned to a foreground object depicted in the sequence of video frames. The object classification type may be used to classify the foreground object as being an instance of one of a plurality of foreground object classification types. Additionally, the object classification type may assigned to the foreground object based on a plurality of micro-features derived from analyzing pixels depicting the foreground object in the sequence of video frames. The operation may further include generating a visual representation of the requested object classification type and outputting the generated visual representation for display.

Another embodiment of the invention provides a video surveillance system. The video surveillance system may generally include a video input source configured to provide a sequence of video frames, each depicting a scene, a processor, and a memory containing a program, which when executed by the processor is configured to perform an operation to process the scene depicted in the sequence of video frames. The operation itself may generally include receiving a request to view an object classification type assigned to a foreground object depicted in the sequence of video frames. The object classification type may be used to classify the foreground object as being an instance of one of a plurality of foreground object classification types. Additionally, the object classification type may assigned to the foreground object based on a plurality of micro-features derived from analyzing pixels depicting the foreground object in the sequence of video frames. The operation may further include generating a visual representation of the requested object classification type and outputting the generated visual representation for display.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
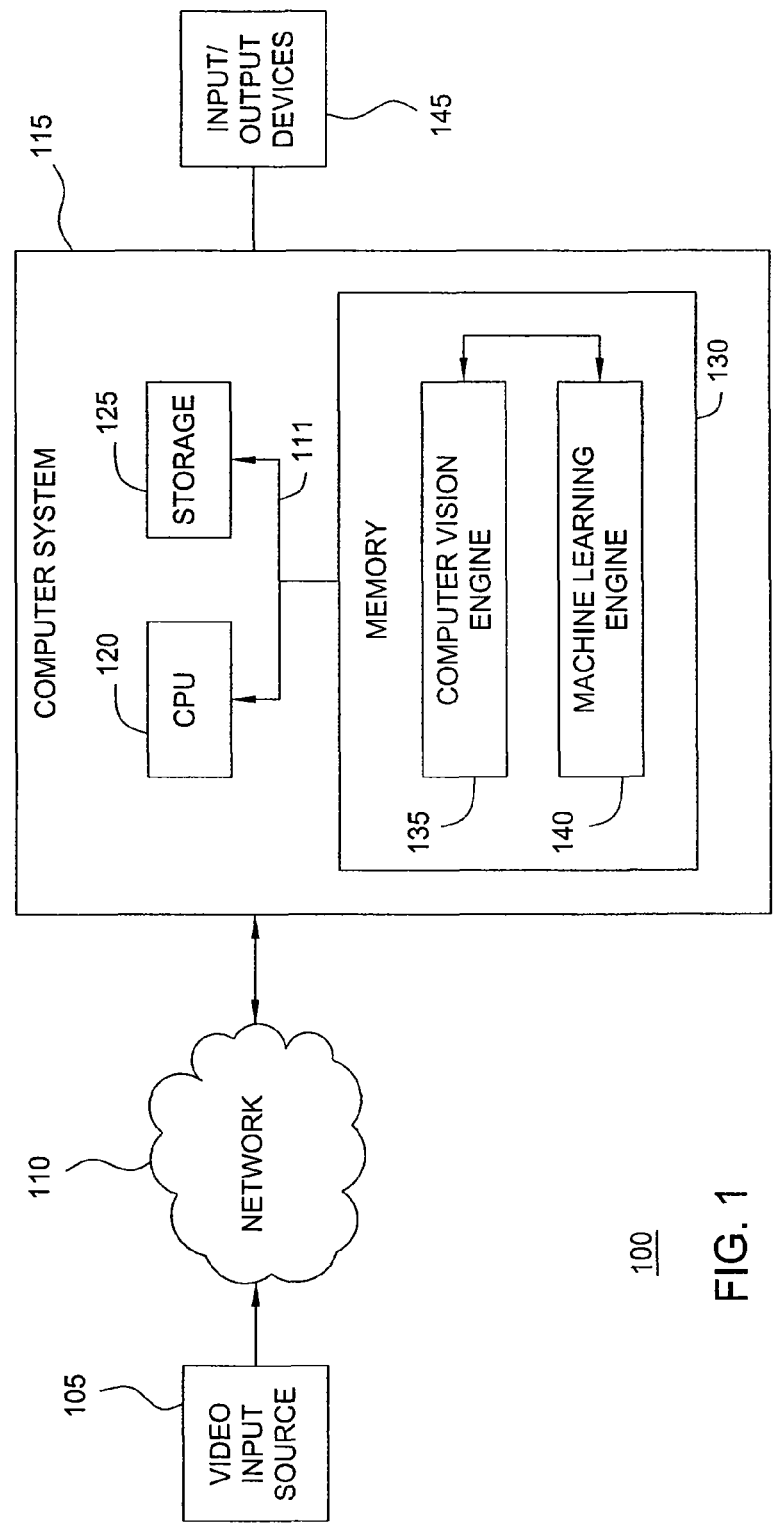
FIG. 1 illustrates components of a video analysis and behavior-recognition system, according to one embodiment of the invention.

Embodiments of the invention provide an interface configured to visually convey information learned by a behavior-recognition system. The behavior-recognition system may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to evaluate a stream of video frames. Typically, each frame of video may be characterized using multiple color (or grayscale) channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a region of the scene (referred to as a "blob" or "patch") is observed with appearance values that differ substantially from the background image, that region is identified as depicting a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames. Each context event may provide kinematic data related to a foreground object observed by the computer vision engine in the sequence of video frames.

Data output from the computer vision engine may be supplied to the machine learning engine. In one embodiment, the machine learning engine may evaluate the context events to generate "primitive events" describing object behavior. Each primitive event may provide semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," "vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories (or long-term "percepts") representing a higher-level abstraction of a car parking in the scene—generated from the primitive events underlying multiple observations of different cars entering and parking. The interface may be configured to visually convey such patterns. Specifically, the patterns may be stored in a long-term memory of the machine learning engine. Further still, patterns representing an anomalous event (relative to prior observation) or events identified as an event of interest may result in alerts passed to users of the behavioral recognition system.

In one embodiment, the machine learning engine may classify foreground objects based on pixel-level micro-features that are extracted from one or more images. The micro-features may be heuristic features of foreground patches depicting objects in frames of video. The micro-features may be represented as a vector input to a micro-feature classifier. The micro-feature classifier may learn a set of distinct object types, over time, through observing different micro-feature vectors. In one embodiment, the micro-feature classifier includes a self-organizing map and adaptive resonance theory (SOM-ART) network. The SOM-ART network processes the pixel-level micro-features to adaptively learn and organize the micro-features into object type clusters. In other words, the machine learning engine may classify foreground objects into object type clusters (or "classifications"). Each object type cluster represents a specific type of foreground object, such as a human, a car, a truck, a motorcycle, etc. The machine learning engine may also provide an arbitrary symbol (such as a number) for distinctly labeling each object type cluster. In one embodiment, the training of the SOM-ART network is unsupervised, i.e., performed independent of any training data that defines particular objects. That is, the ability of the SOM-ART network to classify objects is not constrained by specific object definitions.

Further, the video surveillance system may generate an alert upon observing an object that matches a specified type of object, as specified by metadata properties associated with a given object type. For example, a user may specify that an alert should be generated whenever a particular object type is observed in a scene e.g., for an object type of "person," a rule specifying that an alert should be generated whenever an object classified as being a "person" is detected in a restricted area monitored by the video surveillance system, regardless of how common it is for people to be in the restricted area. Thus, the metadata attributes allow users to have alerts generated not only for events, observations, based on a frequency of occurrence (as learned by the machine learning engine) but also for events that, while not anomalous relative to frequency, are nevertheless of significant interest to a user of the video surveillance system.

In one embodiment, the machine-learning engine may include a transaction server. The transaction server may generate a visual representation of classifications derived by the machine learning engine. Thus, the transaction server allows users to explore data learned by the machine-learning engine. Further, the transaction server allows users to specify how the system is to respond to certain observed events and/or behaviors (for example, when to produce (or not produce) an alert). For instance, the transaction server may receive a request to view classifications learned from observing objects in a scene. In response, the transaction server may generate a visual representation of the classifications. The visual representation may include a grid of hexagonal blocks. Each hexagonal block may represent a node of the SOM. Further, each hexagonal block may be shaded to indicate which object type cluster the corresponding node belongs to (i.e., as classified by the ART network). Alternatively, the transaction server may also transmit learned data to a client application. The client application may generate a visual representation of the classifications from the learned data. Further, the transaction server may also receive user requests to associate metadata with a classification. The metadata may be used to guide system behavior. For example, a user may provide a name for a classification, specify a rule that the system should generate an alert (or refrain from generating an alert) upon observing anomalous events matching a classification, or otherwise modify metadata associated with a classification.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the invention. As shown, the behavior-recognition system 100 includes a video input source 105, a network 110, a computer system 115, and input and output devices 145 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 may provide software applications configured to analyze a sequence of video frames provided by the video input source 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like. Additionally, although shown as a single video input source 105, the system 100 may support many video cameras—each observing a distinct scene. Further, each camera may have multiple preset positions (i.e., a single camera may, in fact, be trained on more than one scene). In such cases, a separate instance of the computer vision engine 135 and machine learning-engine 140 may be available to observe the video stream from each camera (and presets, if any).

The computer vision engine 135 may be configured to analyze this raw information to identify active objects in the video stream, classify the objects, derive a variety of metadata regarding the actions and interactions of such objects, and supply this information to a machine-learning engine 140. In turn, the machine-learning engine 140 may be configured to evaluate, observe, learn, and remember details regarding events (and types of events) that transpire within the scene over time.

In one embodiment, the machine-learning engine 140 receives the video frames and the data generated by the computer vision engine 135. The machine-learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 145 to issue alerts, for example, an alert message presented on a GUI screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application running on another computer system may request (or receive) the results of over network 110.

Figure 2:
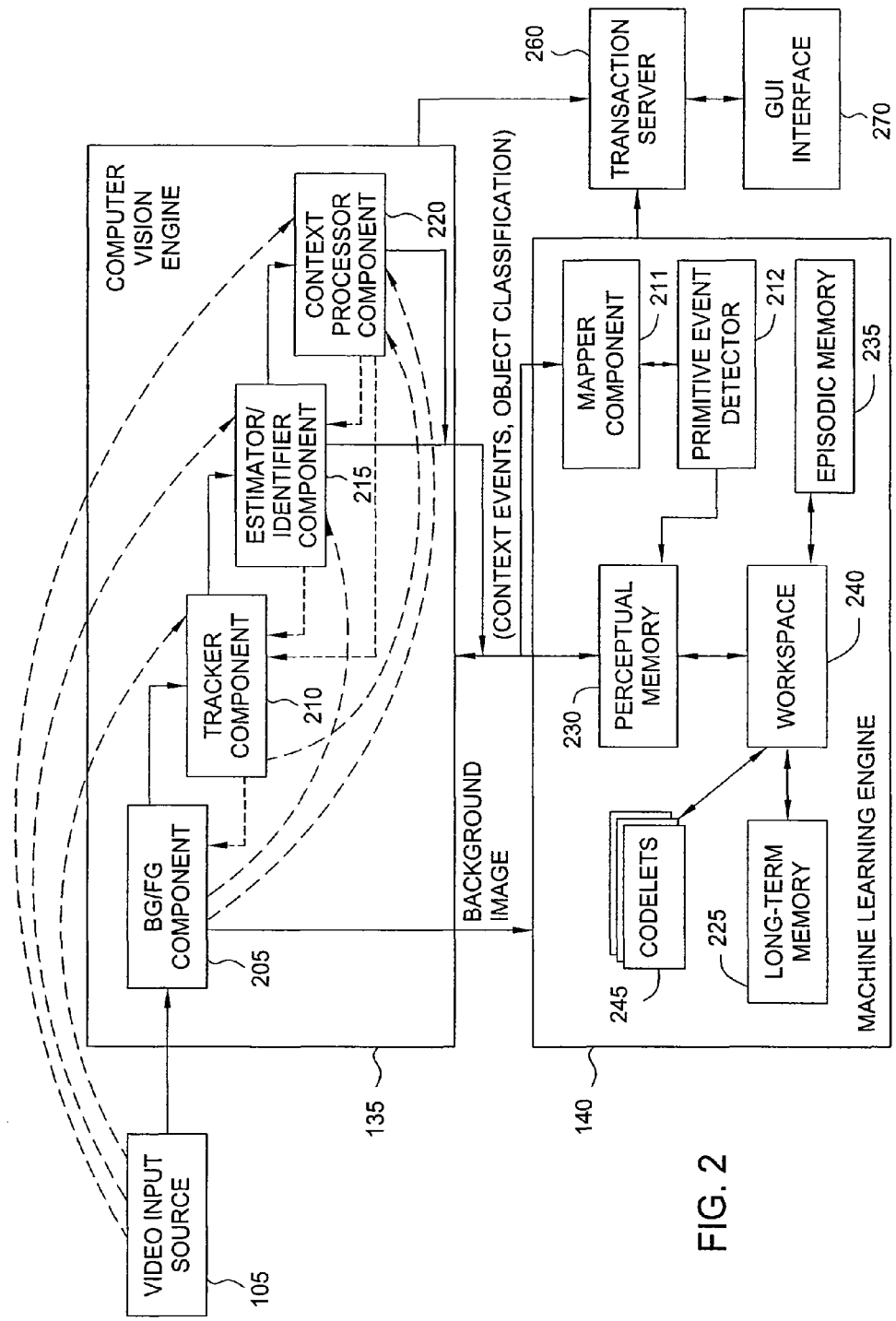
FIG. 2 further illustrates components of a computer vision engine and a machine-learning engine, according to one embodiment of the invention.

FIG. 2 further illustrates components of the computer vision engine 135 and the machine-learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model the background states for each pixel using a corresponding ART network. In such a case, mature clusters in the art network for a given pixel may represent a distinct background state for the scene being observed. That is, each mature cluster may represent a pixel color value (and mean and variance from that value) expected to be observed in a frame of video when the background of the scene is visible to the camera. Typically, a cluster in the ART network is "mature" after a specified number of inputs have been mapped to that pixel. For example, consider a camera fixed on an elevator lobby. An ART network corresponding to a pixel could steadily fluctuate between a pixel color value obtained when an elevator door was closed and one when it was open—with other colors transiently being observed as agents (people) move about the scene. This could result in an ART network with two mature clusters (one modeling the color values when the elevator door is closed and one modeling when it is open). In this manner, each pixel may be classified as depicting scene foreground or scene background (from frame-to-frame) using an ART network modeling a given pixel.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. In one embodiment, a patch may be evaluated over a number of frames before being forwarded to other components of the computer vision engine 135. For example, the BG/FG component 205 may evaluate features of a patch from frame-to-frame to make an initial determination that the patch depicts a foreground agent in the scene as opposed to simply a patch of pixels classified as foreground due to camera noise or changes in scene lighting. Additionally, pixels classified as depicting scene background maybe used to a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object. Alterntivaely, the machine learning engine 140 may classify foreground objects observed by the vision engine 135. For example, the machine-learning engine 140 may include an unsupervised classifier configured to observe and distinguish among different agent types (e.g., between people and vehicles) based on a plurality of micro-features (e.g., size, speed, appearance characteristics, etc.).

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

The computer vision engine 135 may take the outputs of the components 205, 210, 215, and 220 describing the motions and actions of the tracked objects in the scene and supply this information to the machine-learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine-learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine-learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as a binary ART network and a sparse-distributed memory data structure.

The mapper component 211 may receive the context event stream and the primitive event stream and parse information to multiple ART networks to generate statistical models of what occurs in the scene for different groups of context events and primitive events.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

Further, both the computer vision engine 135 and the machine learning engine 140 may interface with a transaction server 260 and a GUI tool 270 to allow users to explore data learned by the machine-learning engine 140, according to one embodiment. Users may also specify, via the GUI tool 270, how the system is to respond to certain observed events and/or behaviors (for example, when to produce (or not produce) an alert). Note, while FIG. 2 shows the transaction server 260 as being separate from the machine learning engine 140, those skilled in the art will recognize that the transaction server 260 may readily be integrated as part of the machine learning engine 140.

Figure 3:
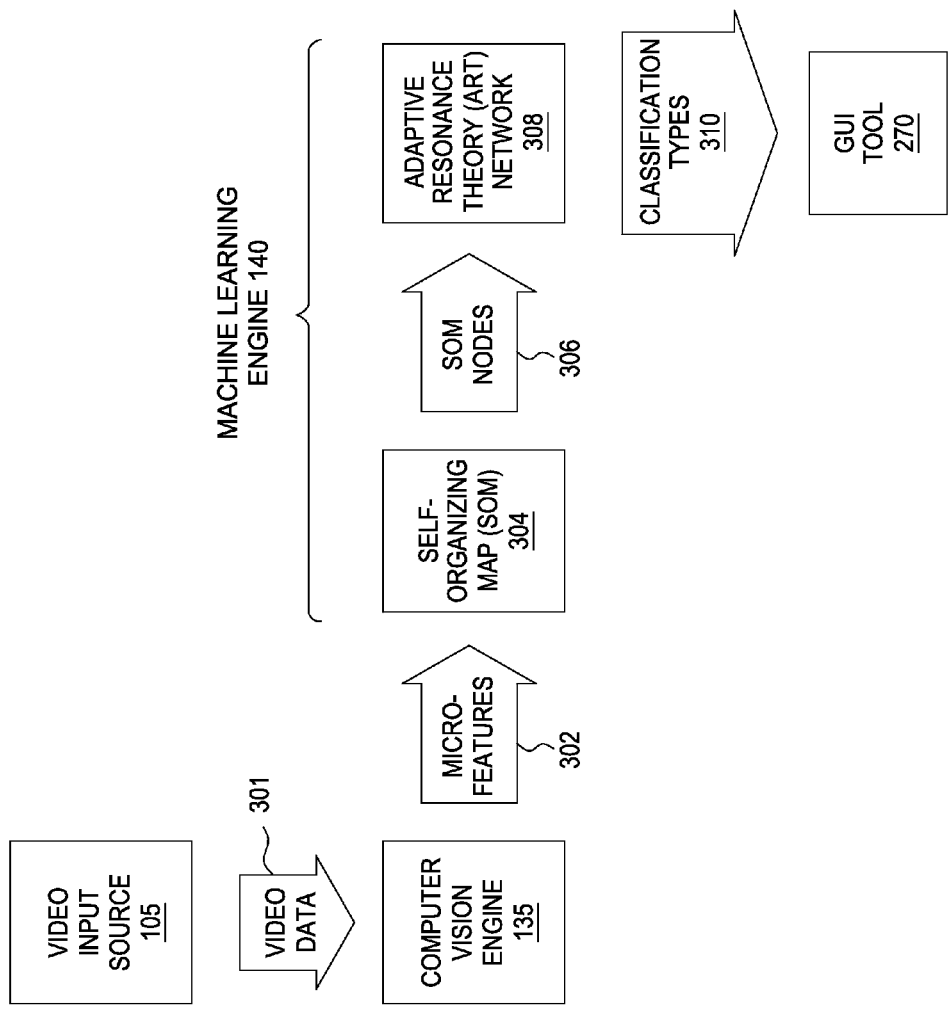
FIG. 3 illustrates a data flow of the video analysis and behavior-recognition system, according to one embodiment of the invention.

FIG. 3 illustrates a data flow 300 of the computer system 115 of FIG. 1, according to one embodiment of the invention. As shown, the data flow includes the video input source 105, the computer vision engine 135, the machine learning engine 140, and the GUI tool 270. In one embodiment, the video input source 105 may record and send video data 301 to the computer vision engine 135. The computer vision engine 135 may process the video data 301 and produce micro-features 302 of foreground objects depicted in the video data 301. Micro-features of a foreground object refer to pixel-level characteristic(s) of the foreground object (derived from the video data 301). Further, micro-features may be packaged as a micro-feature vector that includes micro-feature values. Examples of micro-feature values include values representing a foreground object's hue entropy, magnitude-saturation ratio, orientation angle, pixel area, aspect ratio, groupiness (based on the pixel-level spatial distribution), legged-ness, verticality (based on per-pixel gradients), animateness, periodicity of motion, etc. For example, valid micro-feature values may range in value from 0 to 1 (inclusive) and −1 may be used to represent an invalid micro-feature value that should not be used for classification. The micro-feature values may be represented in a floating point format.

As noted, the computer vision engine 135 may track objects frame-to-frame and generate micro feature vectors for each foreground object at a rate of, e.g., 5 Hz. In one embodiment, the machine learning engine may be configured to create clusters from this stream of micro feature vectors. For example, each micro feature vector may be supplied to an input layer of the ART network (or a combination of a self organizing map (SOM) and ART network used to cluster nodes in the SOM). In response, the ART network maps the micro feature vector to a cluster in the ART network and updates that cluster (or creates a new cluster of the input micro feature vector is sufficiently dissimilar to the existing clusters). Each cluster is presumed to represent a distinct object type, and objects sharing similar micro feature vectors (as determined using the choice and vigilance parameters of the ART network) are mapped to the same cluster.

In one embodiment, the machine learning engine 140 includes a SOM-ART network. The SOM-ART network includes a SOM 304 and an ART network 308. As is known, a self-organizing map (SOM) 304 provides an artificial neural network trained using unsupervised learning to produce a low-dimensional, discretized representation of a higher-dimensional input space of training samples. The discretized representation is called a map and is typically two-dimensional. Thus, the SOM 304 allows high-dimensional data to be visualized. Further, like many artificial neural networks, SOMs operate in two modes: training and mapping. Training builds the map using sample vector inputs. Mapping assigns new input vectors to a node of the SOM 304.

A SOM 304 includes nodes 306, each node occupying a distinct position in the map. Further, each node 306 includes a weight vector of the same dimension as the input vectors (e.g., micro-feature vectors). The nodes 306 may typically be arranged in an evenly spaced fashion and in a hexagonal or rectangular grid. The SOM 304 maps data from a higher dimensional input space to a lower dimensional map space. For each input vector, the SOM 304 identifies a node 306 having the closest weight vector. The closest weight vector may be identified by computing a Euclidean distance between the input vector and the weight vector. Once identified, the SOM 304 may assign distinct position (i.e., coordinates) of the node 306 in the map to the input vector. The SOM 304 may also adjust the weight vector of the node 306 (and weight vectors of neighboring nodes within a given radius of the node) based on the mapped input vector. The SOM 304 may also decrease the radius over time (as input vectors are mapped).

As described above, the SOM-ART network also includes an ART network 308. Upon each input vector mapping to a node 306 in the SOM 304 (i.e., for each adjustment of the SOM 304), the machine learning engine 140 may supply the SOM 304 to the ART network 308. As is known, Adaptive Resonance Theory (ART) describes a number of neural network models which use supervised and unsupervised learning methods. In one embodiment, the ART network 308 generates clusters from the nodes 306 of the SOM 304. Each cluster represents a statistical distribution of nodes 306 of the SOM 304. Further, the ART network 308 may assign an arbitrary identifier (or symbol) to each cluster. In one embodiment, the ART network 308 may be configured to provide dynamic clustering. That is, a cluster in ART network 308 may change in size/shape as each set of SOM nodes 306 is mapped to that cluster. A cluster may initially be defined as a relatively small size. However, as inputs are mapped to that cluster, the size may grow and change over time. Further, the clusters may decay over time. For example, if a cluster does not receive a set of SOM nodes 306 (reinforcing the importance of that cluster) for a specified period of time, such a cluster may be removed from an ART network 308.

In one embodiment, the machine learning engine 140 (via the SOM-ART network) creates object type clusters from a group of inputs, e.g., micro-feature vectors. Each element (micro-feature value) of the micro-feature vector is a dimension of an input to the SOM 304. Each object type cluster corresponds to a classification 310 of an object depicted in a scene. For example, the machine learning engine 140 may classify an object as being one of the learned object types (e.g., a person, a car, a truck, etc.) or as an unrecognized (unknown) object type based on a distance measure between a micro-feature vector received for the object and the object type clusters of the SOM 304. Further, the machine learning engine 140 performs unsupervised learning to automatically find what and how many object types may exist in the image data. This unsupervised learning and object type cluster discovery are adaptive because the knowledge about existing classes of objects is dynamically updated as new object types appear and are classified by the machine learning engine 140. That is, the machine learning engine 140 is not limited to specific pre-defined object types.

In one embodiment, the GUI tool 270 and the transaction server 260 allow users to retrieve and generate visualizations of classifications 310 (generated by the SOM-ART network of the machine learning engine 140). For example, the transaction server 260 may be configured to processes user requests from the GUI tool 270 to generate and display a visualization of a classification 310. Table I shows examples of transactions that may be supported by the transaction server 260:

TABLE I

Transactions supported by the transaction server 260

| Transaction | Description |
| --- | --- |
| Get preset list | Obtain a list of presets for a specified camera |
| Get scene image | Obtain a picture that represents a scene as viewed by the camera |
| Get classifications, ART labels, and SOM nodes | Obtains all learned data for a specified preset (e.g., including properties) |
| Set always alert | Specifies to always alert on event(s) matching a classification |
| Set always ignore | Specifies to never alert on event(s) matching a classification |
| Modify property | Modify a specified property of a classification |
| Set classification failure to always alert | Specifies to always alert on a failure to classify an object as one of the learned object types |
| Set classification failure to never alert | Specifies to never alert on a failure to classify an object as one of the learned object types |

Figure 4:
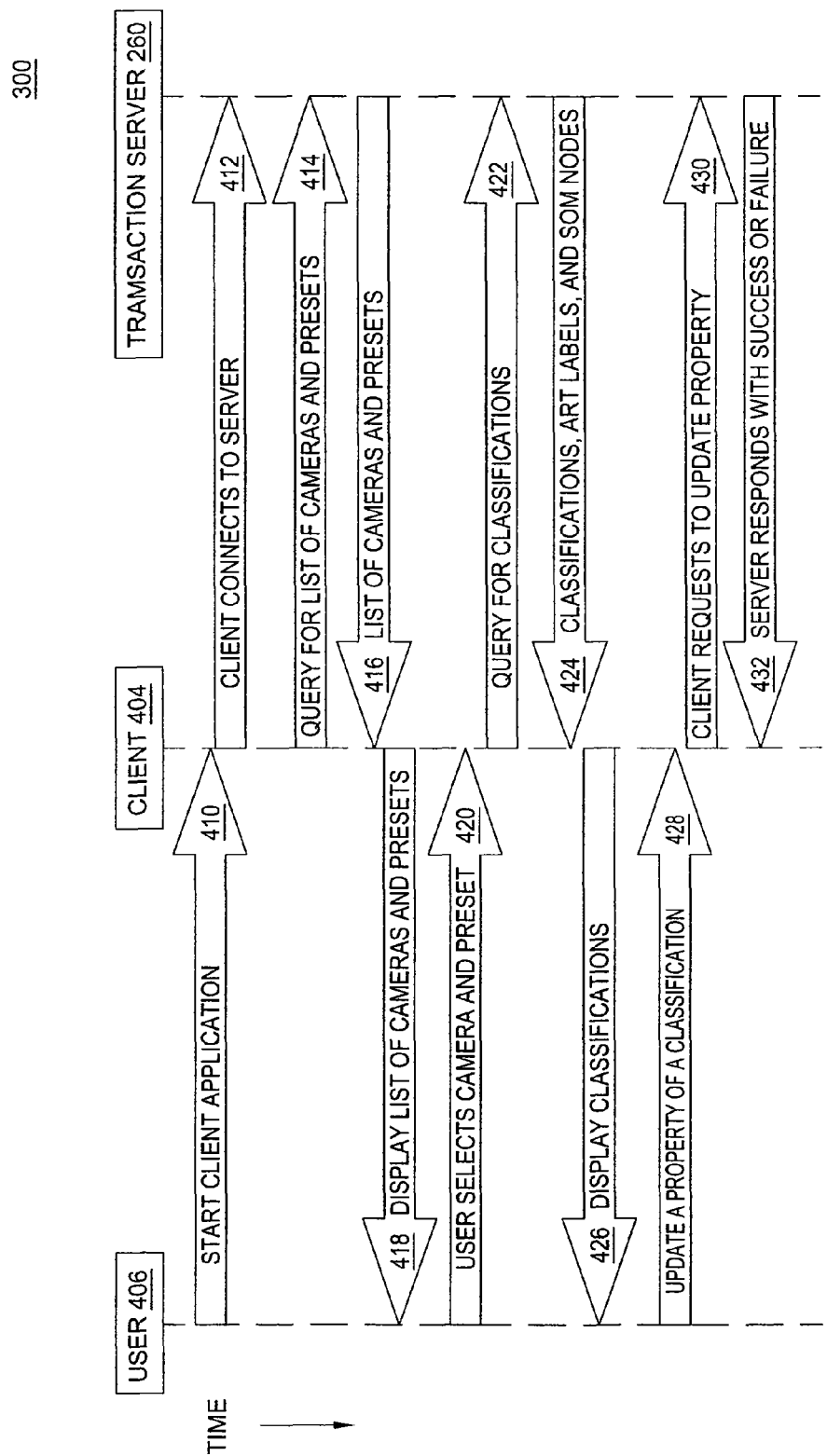
FIG. 4 illustrates a sequence of interactions between a transaction server and a client, according to one embodiment of the invention.

FIG. 4 illustrates a sequence of interactions between the transaction server 260 and a client 404 performed to provide a user 406 with a visualization of a classification, according to one embodiment of the invention. In one embodiment, the transaction server 260 may listen for client requests on a specified port (e.g., via the Berkeley sockets application programming interface (API) over Transmission Control Protocol/Internet Protocol (TCP/IP)). Further, the client 404 and the transaction server 260 may communicate using any application-layer network protocol such as Hypertext Transfer Protocol (HTTP), File Transfer Protocol (FTP), Simple Object Access Protocol (SOAP), etc. Further still, each request to and/or response from the transaction server 260 may be in a standard format such as Extensible Markup Language (XML).

As shown, the method 400 begins at step 410, where the user 406 invokes the client 404. At step 412, a user interacts with the client 404 to connect to the transaction server 260. For example, the client 404 may connect to a specified IP address and port number on which the transaction server 260 is listening. At step 414, the client 404 queries for a list of cameras and associated presets 416. Each preset may include a location and orientation of a video camera observing (or having observed) a scene. At step 416, the transaction server 260 returns a list of cameras and presets to the client 404. At step 418, the client 404 displays the list of cameras and presets to the user 406.

At step 420, the user 406 selects a camera and a preset. The client 404 then queries for a list of classifications, ART labels, and SOM nodes from the server 402 for the selected camera and preset (step 422). At step 424, the server 402 returns the list of classifications, ART labels, and SOM nodes to the client 404. Alternatively, the server 402 may be configured to return a list of object classification typos for a currently active scene being observed by the computer vision engine 135 and machine-learning engine 140. In one embodiment, the client 404 may also recive an example clip from frames of video showing one or more examples of an object classified as being an instance of the object classification type. For example, the client may recive image data depdicitng multiple instances of object classified as being a vehicle or a person. At step 426, the client 404 displays the list of object classification typos to the user 406. The 406 may select a classification from the list. The client 404 may then display properties associated with the selected classification. The properties may include an identifier for the classification, a label for the classification, alert preferences for the classification, etc. The client 404 may also allow the user 406 to modify one or more properties for a classification. For example, a user 406 may modify a label for a classification to customize how the GUI tool 270 conveys information for the classification.

At step 428, the user 406 modifies a property of a classification via the client 404. At step 430, the client 404 sends a request to the server 402 to update the property of the classification. At step 432, the server 402 attempts to update the property of the classification and returns a result to the client 404 indicating success or failure of the attempted update. After the step 432, the method 400 terminates. The user 406 may also continue to interact with the client 404 (e.g., via the steps 410, 420, or 428).

Figure 5:
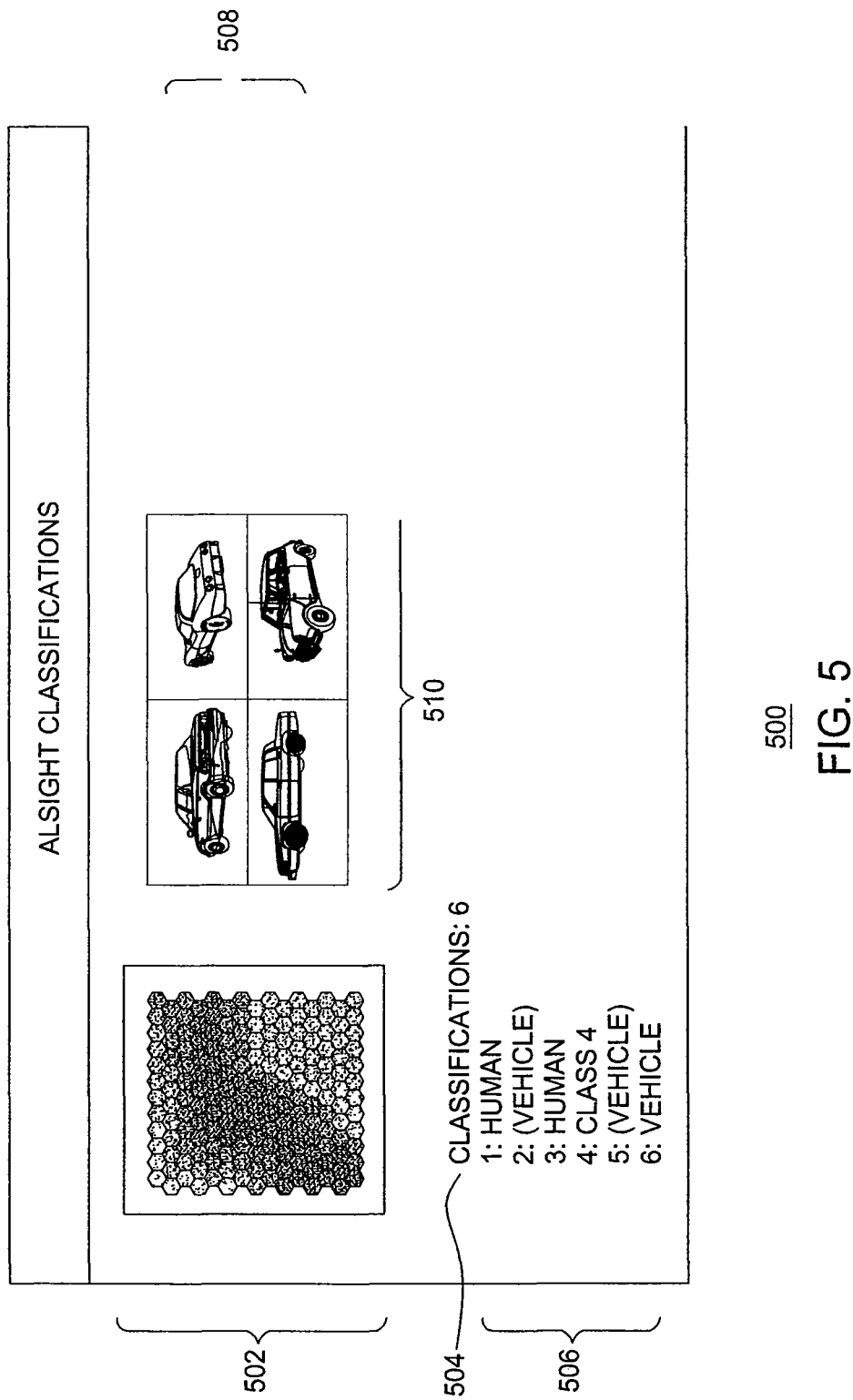
FIG. 5 illustrates a graphical user interface (GUI) conveying a classification, according to one embodiment of the invention.

FIG. 5 illustrates a graphical user interface display (GUI) 500 presenting a visualization of a classification from the machine learning engine 140, according to one embodiment of the invention. As shown, the GUI 500 includes a visualization 502 of a SOM, a count 504 of classifications, a list 506 of classifications, properties 508 of a classification, and images 510 of objects matching a selected classification.

As shown, the visualization 502 of the SOM includes nodes of the SOM arranged in an evenly spaced fashion and in a hexagonal grid. Further, each node may be shaded (or otherwise visually distinguished from other nodes) to indicate which object type cluster (i.e., classification) the node belongs to (as classified by the ART network). Thus, a classification may be visualized as nodes belonging to a single object type cluster in the visualization 502 of the SOM. Because a node includes a weight vector that represents micro-features (such as orientation angle, animateness, etc.) of objects in a scene, the visualization of the SOM node may also be derived from the weight vector of the SOM node.

In one embodiment, a user may click on any node in the visualization 502 of the SOM to select the object type cluster to which the node belongs. That is, clicking the SOM node may select all nodes belonging to the object type cluster (as classified by the ART network). Aside from selecting a classification by clicking on the SOM, a user may also select a classification from the list 506 of classifications. Further, a user may navigate through the list 506 of classifications (e.g., using arrow keys of a keyboard or using a scroll bar for the list 506 of classifications). Upon receiving user input selecting a classification (e.g., from the list 506 of classifications or from the SOM 502), the GUI tool 270 may highlight, in the visualization 502 of the SOM, nodes belonging to the classification. Further, the GUI tool may also display images 510 of objects matching the classification. The images may be selected based on properties of classified objects (such as how recently the objects were classified, how strongly the object matches a classification, etc.). For instance, if a user selects a classification of "car," the GUI tool 270 may display four recent objects observed in the scene that matched the selected classification of "car."

As shown, the count 504 of classifications indicates that the ART network clusters the nodes of the SOM into a total of six classifications. Further, the GUI tool 270 may display properties 508 of the selected classification. As shown, the properties 508 of the classification include an identifier for the classification, a symbol of the classification, ancestors of the classification, whether to alert upon detecting a foreground object that matches the classification. Ancestors of a classification refer to two or more classifications that are merged to form the classifications. The user may supply or modify the symbol or label for the classification, according to one embodiment. Further, the user may also set the machine-learning engine 140 to alert (or not to alert) whenever the machine-learning engine detects that an object matching the classification is observed.

Figure 6:
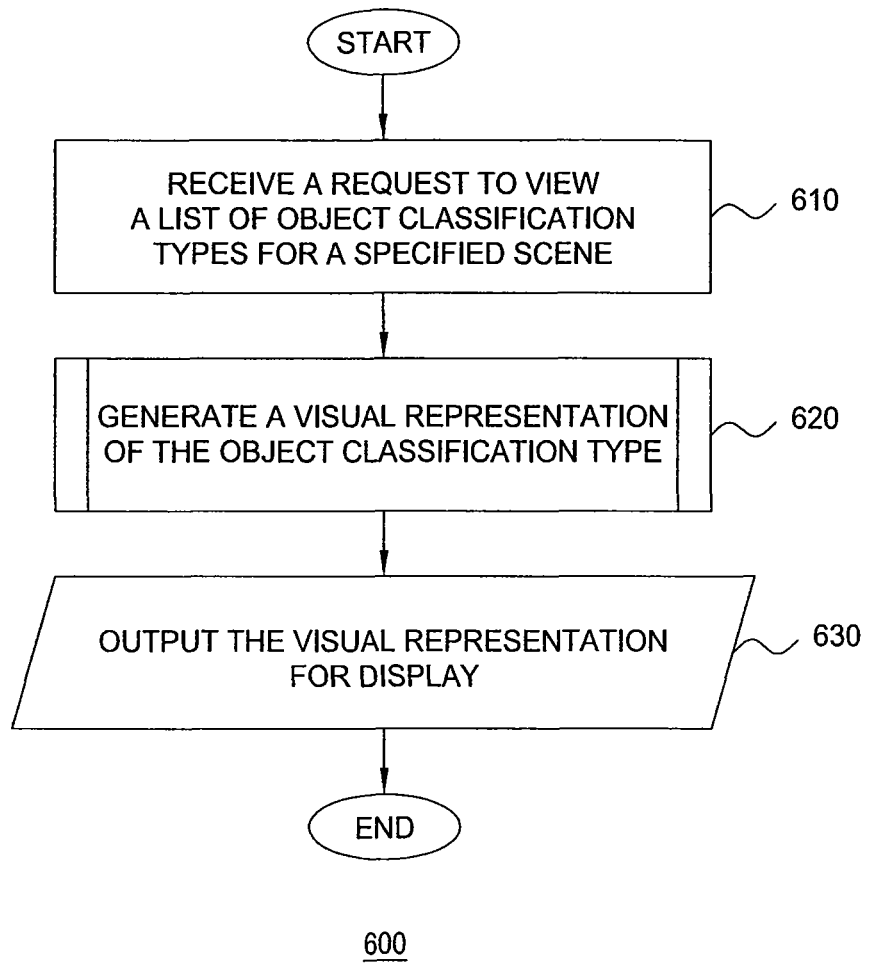
FIG. 6 illustrates a method for generating a visualization of a classification, according to one embodiment of the invention.

FIG. 6 illustrates a method 600 for generating a visual representation of classifications for a scene, according to one embodiment of the invention. As shown, the method 600 begins at step 610, where the transaction server 260 receives a request to view classifications for the scene. For example, a user may specify a camera and a preset for the camera for which the user desires to view the classifications.

At step 620, the transaction server 260 (and/or the GUI tool 270) generates a visual representation of the classification. For example, the transaction server 260 may generate, from object type clusters that emerge from the SOM-ART network (based on micro-features of objects in the scene), a grid of evenly-spaced hexagonal nodes. Each hexagonal node represents a node of the SOM. Further, nodes classified as belonging to a single object type cluster may be visually distinguished (e.g., shaded using a specific color) from nodes not classified as belonging to the single object type cluster. For example, the visual representation of the classification may the shaded nodes. Further, the visual representation of the classification may also include images of objects matching the classification. The images may assist a user in naming (or renaming) a classification. Further, the GUI tool 270 may be configured to allow the user to view and/or modify properties of any classification selected by the user. At step 630, the transaction server 260 (and/or the GUI tool 270) may output the visual representation for display. After step 630, the method 600 terminates.

Figure 7:
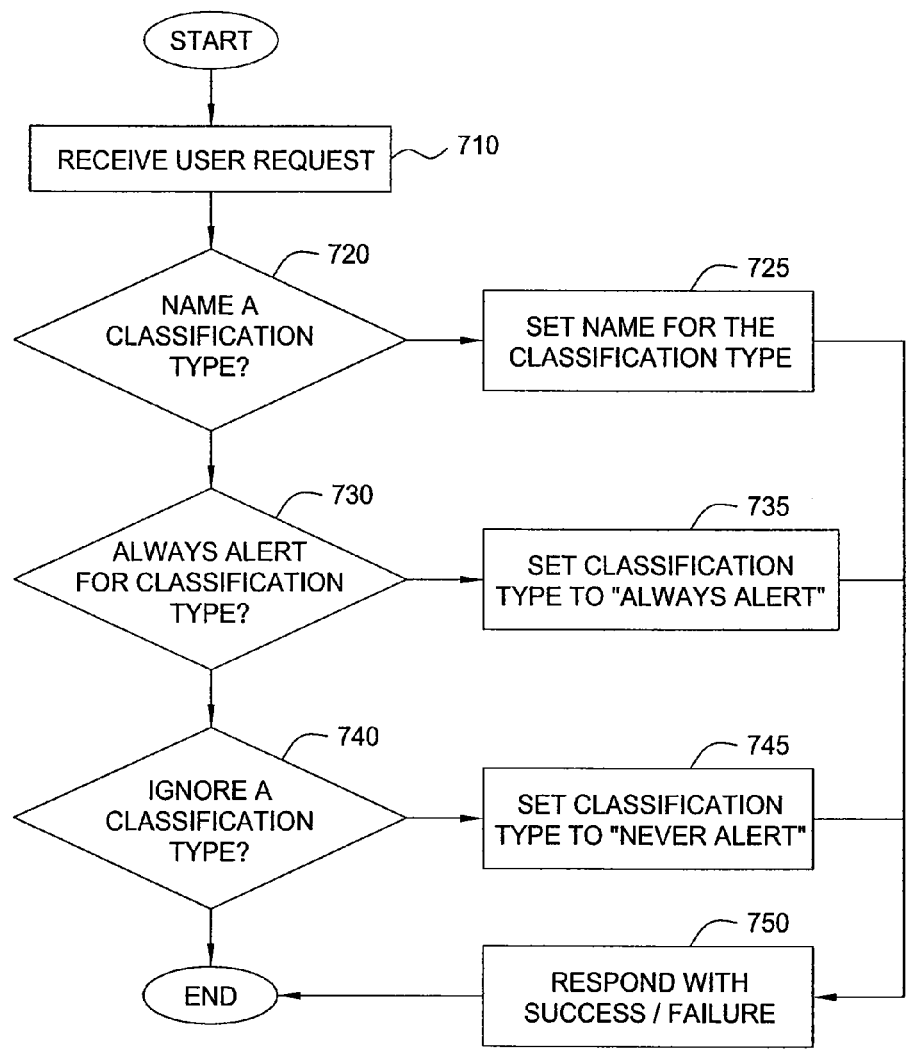
FIG. 7 illustrates a method for modifying metadata attributes of an object classification type, according to one embodiment of the invention.

FIG. 7 illustrates a method 700 for modifying metadata attributes of an object classification type, according to one embodiment of the invention. As shown, the method 700 begins at step 710, where the transaction server 260 receives a user request to modify a metadata attribute associated with the object classification type. For example, the user may specify a name or label to assign to an object classification type (steps 720 and 725). Similarly, the user can set metadata attributes specifying how alerts should (or should not) be generated when the machine learning engine detects an instance of a given object classification type has appeared (or disappeared) from the scene. If the user request is to always alert for a classification (step 730), the transaction server 260 may set the machine-learning engine 140 to always alert upon observing a foreground object that matches the object classification type (step 735). If the user request is to ignore instances of a particular object classification type (step 740), the transaction server 260 may set the machine-learning engine 140 to never alert upon observing objects matching the classification (step 745). Of course, the variety of metadata attributes that the user may specify for a given object classification type may be tailored to suit the needs of a particular case. After the steps 725, 735, or 745, the transaction server 260 may respond with a success or failure of servicing the user request (step 750). After the steps 740 or 750, the method 700 terminates.

Advantageously, embodiments of the invention visually convey classifications derived from pixel-level micro-features extracted from image data. The image data may include an input stream of video frames depicting one or more foreground objects. The classifications represent information learned by a video surveillance system. Further, the visualization may provide an interface used to guide system behavior. In one embodiment, a GUI tool allows a user to visualize and manipulate classifications derived by a video surveillance system. For example, users may specify that observations matching an existing classification are to always (or never) result in an alert. Further, the GUI tool may allow users to modify other various properties of a classification, including semantic labels used to name the classification.

While the foregoing is directed to embodiments of the present invention, other and further embodiments of the invention may be devised without departing from the basic scope thereof, and the scope thereof is determined by the claims that follow.

What is claimed is:

1. A computer-implemented method for a video surveillance system to process a sequence of video frames depicting a scene captured by a video camera, comprising:
   receiving a request to view an object classification type assigned to a foreground object depicted in the sequence of video frames, wherein the object classification type classifies the foreground object as being an instance of one of a plurality of foreground object classification types, wherein the object classification type is assigned to the foreground object based on a plurality of micro-features derived from analyzing pixels depicting the foreground object in the sequence of video frames, wherein the object classification type is generated by mapping micro-features derived from a plurality of foreground objects to nodes of a self-organizing map (SOM) and wherein an Adaptive Resonance Theory (ART) network clusters resulting nodes in the SOM, and wherein each ART network cluster corresponds to one of the plurality of foreground classification types;
   generating a visual representation of the requested object classification type;
   outputting the generated visual representation for display;
   receiving user input requesting to modify a metadata attribute of the object classification type assigned to the foreground object; and
   modifying the metadata attribute of the object classification, based on the received user input.

2. The computer-implemented method of claim 1, wherein the micro-features include at least one of hue entropy, magnitude-saturation ratio, orientation angle, pixel area, aspect ratio, groupiness, legged-ness, verticality, animateness, and periodicity of motion of the foreground object in the sequence of video frames.

3. The computer-implemented method of claim 1, wherein the metadata attribute is a user-specified name for object classification type.

4. The computer-implemented method of claim 1, wherein the metadata attribute specifies to publish an alert message upon detecting an instance of a second foreground object in the scene assigned the object classification type.

5. The computer-implemented method of claim 1, wherein the metadata attribute specifies to not publish an alert message upon detecting an instance of a second foreground object in the scene assigned the object classification type.

6. The computer-implemented method of claim 1, wherein the visual representation of the requested object classification type includes image data from the sequence of video frames depicting one or more instances of the object classification type.

7. A non-transitory computer-readable storage medium containing a program which, when executed by a video surveillance system, performs an operation to process a sequence of video frames depicting a scene captured by a video camera, the operation comprising:
   receiving a request to view an object classification type assigned to a foreground object depicted in the sequence of video frames, wherein the object classification type classifies the foreground object as being an instance of one of a plurality of foreground object classification types, wherein the object classification type is assigned to the foreground object based on a plurality of micro-features derived from analyzing pixels depicting the foreground object in the sequence of video frames, and wherein the object classification type is generated by mapping micro-features derived from a plurality of foreground objects to nodes of a self-organizing map (SOM), wherein an Adaptive Resonance Theory (ART) network clusters resulting nodes in the SOM, and wherein each ART network cluster corresponds to one of the plurality of foreground classification types;
   generating a visual representation of the requested object classification type; and
   outputting the generated visual representation for display;
   receiving user input requesting to modify a metadata attribute of the object classification type assigned to the foreground object; and
   modifying the metadata attribute of the object classification, based on the received user input.

8. The computer-readable storage medium of claim 7, wherein the micro-features include at least one of hue entropy, magnitude-saturation ratio, orientation angle, pixel area, aspect ratio, groupiness, legged-ness, verticality, animateness, and periodicity of motion of the foreground object in the sequence of video frames.

9. The computer-readable storage medium of claim 7, wherein the metadata attribute is a user-specified name for object classification type.

10. The computer-readable storage medium of claim 7, wherein the metadata attribute specifies to publish an alert message upon detecting an instance of a second foreground object in the scene assigned the object classification type.

11. The computer-readable storage medium of claim 7, wherein the metadata attribute specifies to not publish an alert message upon detecting an instance of a second foreground object in the scene assigned the object classification type.

12. A video surveillance system, comprising:
a video input source configured to provide a sequence of video frames, each depicting a scene;
a processor; and
a memory containing a program, which when executed by the processor is configured to perform an operation to process the scene depicted in the sequence of video frames, the operation comprising:
receiving a request to view an object classification type assigned to a foreground object depicted in the sequence of video frames, wherein the object classification type classifies the foreground object as being an instance of one of a plurality of foreground object classification types, wherein the object classification type is assigned to the foreground object based on a plurality of micro-features derived from analyzing pixels depicting the foreground object in the sequence of video frames, wherein the object classification type is generated by mapping micro-features derived from a plurality of foreground objects to nodes of a self-organizing map (SOM) and wherein an Adaptive Resonance Theory (ART) network clusters resulting nodes in the SOM and wherein each ART network cluster corresponds to one of the plurality of foreground classification types,
generating a visual representation of the requested object classification type,
outputting the generated visual representation for display,
receiving user input requesting to modify a metadata attribute of the object classification type assigned to the foreground object, and
modifying the metadata attribute of the object classification, based on the received user input.

13. The video surveillance system of claim 12, wherein the metadata attribute is a user-specified name for object classification type.

14. The video surveillance system of claim 12, wherein the metadata attribute specifies to publish an alert message upon detecting an instance of a second foreground object in the scene assigned the object classification type.

15. The video surveillance system of claim 12, wherein the metadata attribute specifies to not publish an alert message upon detecting an instance of a second foreground object in the scene assigned the object classification type.

* * * * *